Patented July 5, 1932

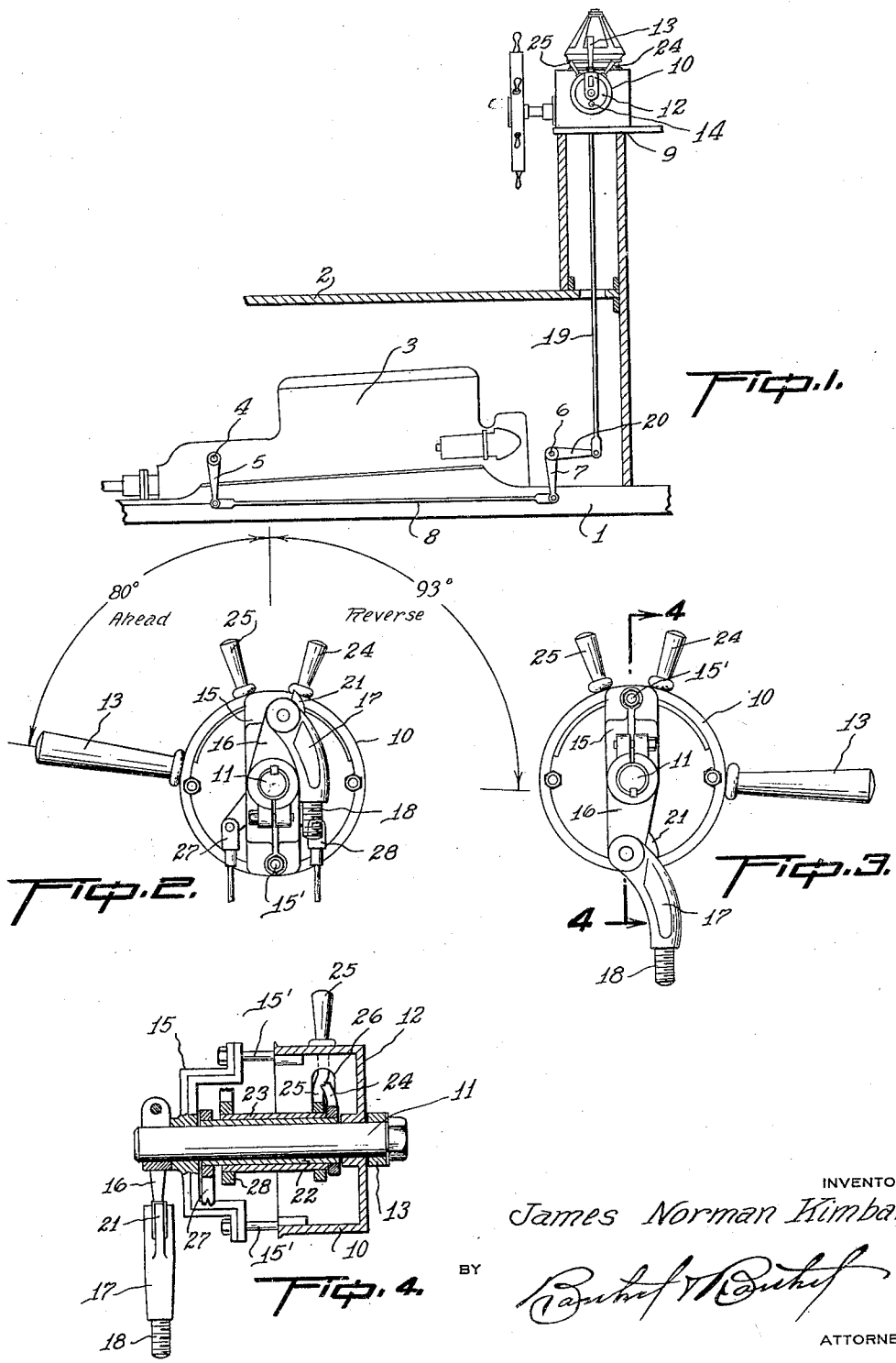

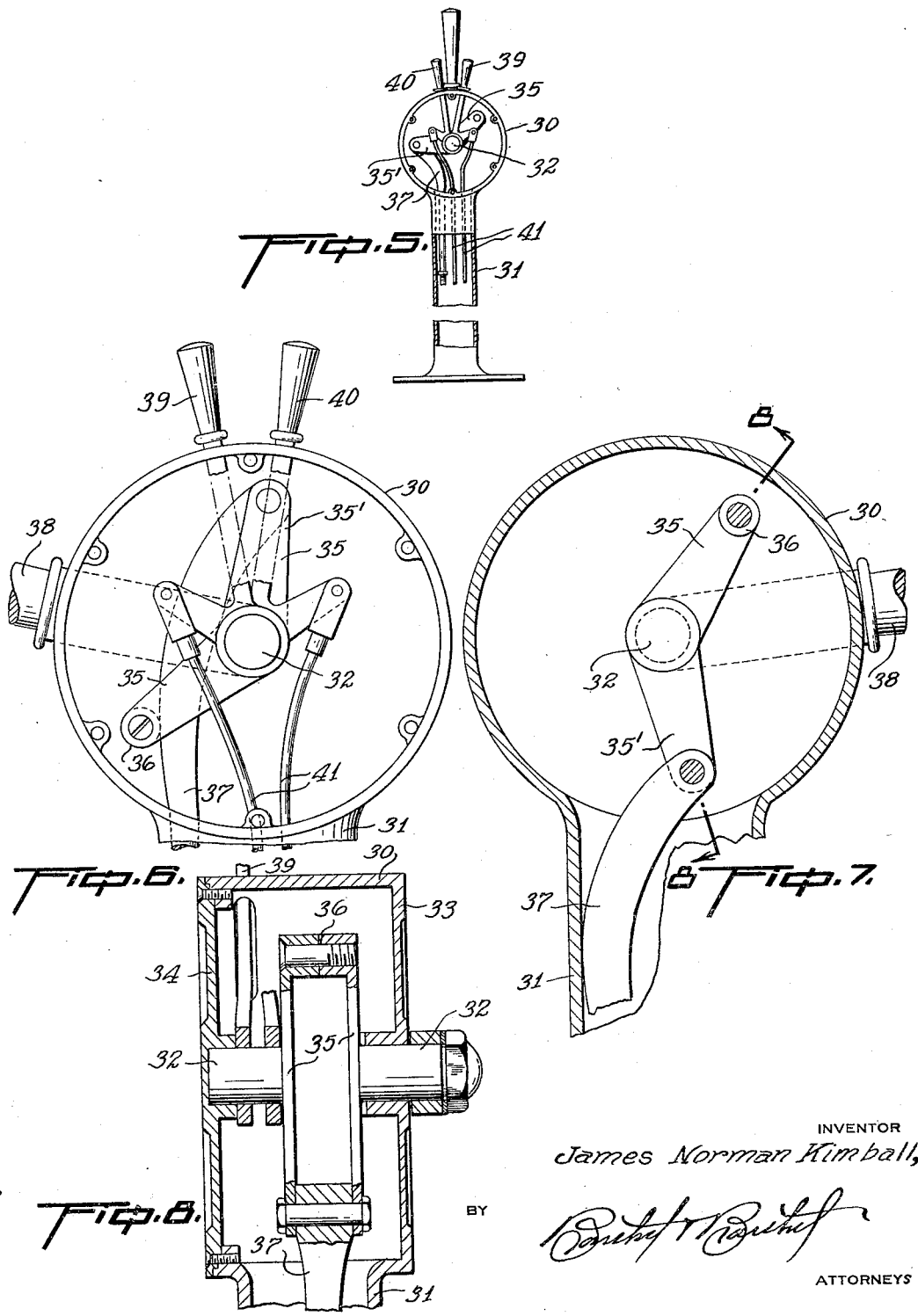

1,865,861

UNITED STATES PATENT OFFICE

JAMES NORMAN KIMBALL, OF DETROIT, MICHIGAN

CONTROL FOR REVERSIBLE ENGINES

Application filed March 18, 1931. Serial No. 523,639.

The present invention pertains to a novel control device for reversible engines, particularly on board power boats. Marine engines generally have only two positive drives, namely forward and reverse, determined by the operation of a clutch capable of assuming two extreme positions and an intermediate idle or neutral position. Considerable force is required to throw the clutch into either driving position, and the necessary force is greater in engines of larger size.

The principal object of the invention is to provide a control device whereby power may be multiplied through a leverage system to such an extent that the operator may conveniently throw the clutch of even a fairly large engine with comparatively little effort. The invention further embodies a stop or contact device which prevents the operator from locking the system in a dead center position with the clutch engaged for forward drive, when the clutch shifting collar would be burned out.

The invention is fully disclosed by way of example in the following description and in the accompanying drawings, in which—

Figure 1 is an elevation of the control device applied to a motor;

Fig. 2 is a rear elevation of the device in forward position;

Fig. 3 is a similar elevation of the device in reverse position;

Fig. 4 is a section on the line 4—4 of Figure 3;

Fig. 5 is a front elevation of a modified construction, partly in section and with the front cover plate removed;

Fig. 6 is a rear elevation of the device in forward position and with the rear cover plate removed;

Fig. 7 is a vertical section of the device, viewed from the rear side, in reverse position; and Fig. 8 is a section on the line 8—8 of Figure 7.

Reference to these views will now be made by use of like characters which are employed to designate corresponding parts throughout.

In Figure 1 is illustrated a suitable motor support 1 below the deck 2 and having a motor 3 such as an internal combustion engine mounted thereon. A shaft 4 journalled in the engine housing is adapted, when rocked, to throw a clutch (not shown) into forward or reverse drive. An arm 5 is secured exteriorly to this shaft, and another shaft 6 is mounted at one end of the motor exteriorly thereof, in parallel relation to the shaft 4. An arm 7 is secured to the shaft 6 and joined to the arm 5 by a link 8. This construction is more or less conventional, and the invention resides in means for actuating the shaft 6 so that the clutch governed by the shaft 4 may be thrown at will into reverse or forward drive.

A supporting structure 9 is erected on the deck 2 and has secured thereto the head or housing 10 of the control device constituting the present invention. A control shaft 11 is journaled in the axis of the drum-shaped head 10, protruding through the forward wall or face 12 of the latter, as shown more clearly in Figure 4. A radial control handle 13 is fixed to this protruding end as may be seen in Figures 1 and 4. The wall or face 12 may have an electric button 14 mounted therein for signalling to the engineer.

The rear side of the head 10 is preferably open and has secured thereto a bearing bracket 15 in which the rearward portion of the shaft 11 is supported. A control lever 16 is secured to the rear end of the shaft and in turn has a clevis 17 pivoted to the free end thereof. The clevis terminates in a threaded stud 18 for connection to a drag link 19 which in turn is joined to the swinging end of another arm 20 fixed on the shaft 6 as shown in Figure 1. Studs 15' hold the bracket 15 spaced from the head 10 and also serve to secure the head to the support 9.

The forward and reverse driving positions of the engine clutch are attained by raising and lowering the control lever 16 as shown in Figures 2 and 3. Preferably, the device is so constructed that movement of the handle 13 to the right, as viewed from the front, throws the clutch into forward drive, and movement of the handle to the left throws the clutch into reverse drive. The handle 13 is vertical when the clutch is in neutral position. It is capable of swinging about 93° to the left (Fig. 1) for reverse, and 75° to 80° to the right for forward, or less than 90° when the handle is perpendicular to the lever 13.

When the lever is adjusted for forward drive as shown in Figure 2, the clevis 17 abuts the hub of the lever 16 and determines the limit of movement of the lever 16 in this direction. The lever is thus prevented from moving into a vertical position when it would be at dead center with respect to the system comprising the lever, clevis 17 and drag link 19. It will be understood that clutch operating linkage must not be rigid when in forward drive position in order to avoid burning out of the shifting collar, and the aforementioned stop means prevents the linkage from being locked in such rigid position.

In moving the handle 13 to reverse position, the lever 16 is moved through dead center because of the greater range for reverse as stated above. The construction of the clutch is such that no damage is done even by locking the linkage in dead center when the clutch is in reverse. A dog 21 extending from the clevis 17 engages the lever 16 at the end of the movement necessary for reverse drive and thus prevents an excessive movement which would lift the drag link 19 and disengage the clutch from reverse.

The power for actuating the link 19 is multiplied in the ratio of the handle 13 to the lever 16.

For the purpose of adjusting the spark and throttle, concentric shafts 22 and 23 are journaled on the control shaft 11. Operating levers 24 and 25 extend from these shafts respectively through slots 26 in the annular wall of the head 10. Suitable connecting members 27 and 28 extend from the shafts 22 and 23 respectively to the spark and throttle control devices.

The modified form shown in Figures 5 to 8 has its mechanism concealed within a head 30 which rests upon a hollow pedestal 31. The control shaft in this case is in the form of a pair of trunnions 32 journalled respectively in the face 33 of the head and in a back plate 34. A forked member 35 is secured to the trunnions and has one end closed as indicated by the numeral 36. The forked member is preferably angular or in the shape of a bell crank lever with its vertex occurring at the trunnions 32.

A drag link 37 is pivotally suspended from the remaining end of the forked member and is connected to a clutch actuating linkage in the same manner as the drag link 19 of Figure 1.

The opposite driving positions of the clutch are determined by the uppermost and lowermost positions of the pivoted end of the drag link 37. In this case it may be assumed that the uppermost and lowermost positions determine respectively the forward and reverse positions of the clutch. The portion 35' of the forked member between the vertex and the connection to the link 37 to the control lever accomplishes the function of the lever 16 of Figures 1 to 4.

When the clutch has been thrown into forward drive, the link 37 engages the closed end 36, whereby the portion 35' is prevented from moving into dead center where it would lock the linkage in a rigid position. In like manner, the engagement of the clutch in reverse position is determined, and a continued movement out of reverse is prevented, by the engagement of the drag link 37 with the wall of the pedestal 31. As in the previous construction, the control shaft is turned by means of a handle 38 secured to one end thereof in front of the face 33.

The power for actuating the drag link 37 is multiplied in the ratio of the handle 38 to the control lever portion of the forked member 35.

Bell crank levers 39 and 40 for adjusting the spark and throttle are loosely mounted on one of the trunnions 32 and have one arm extending through the head 30. The remaining arm of each bell crank lever is connected by suitable linkage 41 to the spark and throttle controlling devices.

Although specific embodiments of the invention have been illustrated and described, it will be understood that various alterations in the details of construction may be made without departing from the scope of the invention, as indicated by the appended claims.

What I claim is:—

1. A control device comprising a housing, a shaft journalled therein, a control lever and an operating handle secured to said shaft, a drag link member connected to said lever, said link member, in approaching the forward drive adjustment, being adapted to abut another of the aforementioned parts before reaching a dead center position in the system including said lever, shaft and drag link member.

2. A control device for reversing a clutch comprising a housing, a shaft journalled therein, a control lever and an operating handle secured to said shaft, and a drag link member connected to said lever, said member being adapted to abut said shaft, in approaching the forward drive adjustment, before reaching a dead center position in the system including said lever, shaft and drag link member.

3. A control device comprising a housing, a shaft journalled therein, a control lever and an operating handle secured to said shaft, a drag link member connected to said lever, and a dog extending from said member and adapted to stop said lever after movement thereof in a given direction.

4. A control device comprising a housing, a shaft journalled therein, a control lever and an operating handle secured to said shaft, a drag link member connected to said lever, means for preventing said lever, in approaching the forward drive adjustment, from reaching a dead center position in the system including said lever, shaft and drag link member, and a dog extending from said member and adapted to stop said lever after movement thereof towards the opposite dead center position.

5. A control device comprising a housing, a shaft journalled therein, a forked bell crank member fulcrumed at said shaft and closed at one end, a drag link member connected to the other end, an operating handle secured to said shaft, said closed end being adapted to stop said member to prevent the other end, in approaching the forward drive adjustment, from reaching a dead center position in the system including said other end, shaft and drag link member.

In testimony whereof I affix my signature.

JAMES NORMAN KIMBALL.